Jan. 9, 1968 R. T. LARSSON ET AL 3,362,863

METHOD AND APPARATUS FOR APPLYING A BAND OF ADHESIVE-COATED TAPE ABOUT AN ELONGATED ARTICLE

Filed March 23, 1964 6 Sheets-Sheet 1

INVENTORS
ROBERT T. LARSSON
ROBERT W. TWIGG by: Wolfe, Hubbard, Voit & Osann
ATTYS.

INVENTORS
ROBERT T. LARSSON
ROBERT W. TWIGG
by: Wolfe, Hubbard, Voit & Osann
ATTYS.

INVENTORS
ROBERT T. LARSSON
ROBERT W. TWIGG
by: Wolfe, Hubbard, Voit & Osann
ATTYS.

INVENTOR
ROBERT T. LARSSON
ROBERT W. TWIGG
by: Wolfe, Hubbard, Voit & Osann
ATTYS.

INVENTORS
ROBERT T. LARSSON
ROBERT W. TWIGG
by: Wolfe, Hubbard, Voit & Osann
ATTYS.

INVENTORS
ROBERT T. LARSSON
ROBERT W. TWIGG
by: Wolfe, Hubbard, Voit & Osann
ATTYS.

United States Patent Office 3,362,863
Patented Jan. 9, 1968

3,362,863

METHOD AND APPARATUS FOR APPLYING A BAND OF ADHESIVE-COATED TAPE ABOUT AN ELONGATED ARTICLE

Robert T. Larsson, Mount Prospect, and Robert W. Twigg, Rockford, Ill., assignors to Midland Engineering and Machine Co., Rosemont, Ill., a corporation of Illinois Filed Mar. 23, 1964, Ser. No. 353,681
10 Claims. (Cl. 156—185)

ABSTRACT OF THE DISCLOSURE

A method of, and apparatus for, applying a band of pressure-sensitive adhesive-coated tape about an elongated article in which the non-coated end of a roll of tape is held by vacuum and applied to one side of the article and to a flat surface. The surface is pulled to the opposite side of the article, peeling off the tape and applying it about three sides of the article. The tape is then severed and the ends of the severed length of tape wiped in overlapping relation against the fourth article side. The device has a single head assembly combining a resilient applicator pad, vacuum tape holder, cutting blade, tape end wiper, and tape feeding roller. The flat surface is formed by a thin tongue so that bands can be put around articles closely spaced from other structure.

This application relates generally to both method and apparatus for applying a sticky pressure-sensitive tape to an article, and more particularly to the application of a layer of such tape completely about the entire article, or a section thereof.

Since the inception of pressure-sensitive tapes efforts have been directed toward means of enhancing their value to industry by devising ways of automatically applying the same. Because of the low cost and great utility of such tapes, numerous devices have been constructed for handling the multifarious taping jobs undertaken by industry. Nonetheless, and despite efforts in this area, many taping jobs are still done by hand where machine applications are either nonexistent or have proven less reliable.

The handling of pressure-sensitive tapes having a sticky adhesive disposed on a backing of paper, plastic or the like ribbon poses a number of problems due, at least in part, to the ease with which it adheres to practically any surface it contacts, and the pliability of the backing material. Thus, it is a simple matter to accidentally wrinkle the tape, or stick it to the wrong surface, or in an unintentional manner to the intended surface. The result is wasted time and effort and as well as additional expense.

Because of the handling problems of which the aforementioned are exemplary, tape users, of which there are many, have found it heretofore more efficient and economical to use manual labor for taping jobs in spite of the labor costs, and even though there are a number of "machines" available for performing taping tasks. There are some machines adapted for circumferential taping, i.e., the application of tape completely about the perimeter of the article(s). It is a common practice in many such machines to intitially dispose a portion of the tape ribbon, sticky side up, over a projecting, or at least an unobseructed forming fixture. Then the articles are brought into initial contact with the adhesive coated surface and the ends of the tape are wrapped about the article(s) to complete the job. It will be understood that throughout the following description and claims the use of the "article" or "object" is intended to encompass both single and plural objects or articles.

Such machines are not entirely satisfactory where there are other objects (not intended to be wrapped) present which might accidentally engage the exposed adhesive surface. Also, where the object to be wrapped is itself unwieldy, or comprises a part of another object which is stationary or difficult to handle, such devices are substantially less effective. Finally, any device which initially exposes a piece of sticky tape over a fixture, sticky side up, is usually susceptible to all of the problems, at least in its initial stages of operation, inherent in the use of such tapes.

It is now proposed to provide, in the first instance, an automatic device for quickly wrapping articles with sticky tape, which device maintains complete control of the tape through all stages of operation, so that the danger of mishaps common to the use of such tape is greatly reduced.

It is an obective to the present invention to provide both method and apparatus which overcomes the problems normally attendant the handling and application of tape for wrapping a bundle of loosely arranged articles, or other objects, thereby making the application of tape a practical and efficient manner of securing such articles.

Another objective of the invention is to provide both method and apparatus for handling pressure-sensitive tapes, having a sticky adhesive on one side, in relatively close quarters where there is little room to "thread" or fit such tape about an article or articles as the case may be, to wrap the same.

It is still another objective to provide method and apparatus for the wrapping of tape about an article or articles, wherein said article(s) may themselves be difficult to move or displace for wrapping purposes, or in a like manner wherein tape is more efficiently applied by prepositioning the article(s) to be wrapped prior to acting upon them with the tape.

An objective related to the above is the provision of method and apparatus which permits the article(s) to be wrapped to be brought to rest in a desired position prior to any contact with the tape, thereby eliminating accidental or unintended contact with the tape likely to result in the displacing thereof, or wrinkling or other difficulties which cause wasted time and result in a less than satisfactory job.

A more specific objective of the invention is to provide apparatus for applying an accurately sized strip of sticky tape tightly about an article or articles to be taped even though a portion of the surface to be taped is in close proximity to another surface not to be taped, and to accomplish the same quickly and within a minimum of effort.

The preceding, as well as other objects and advantages of the invention will become apparent from a reading of the following detailed description of the invention, taken in conjunction with the appended drawings wherein.

Figure 1:
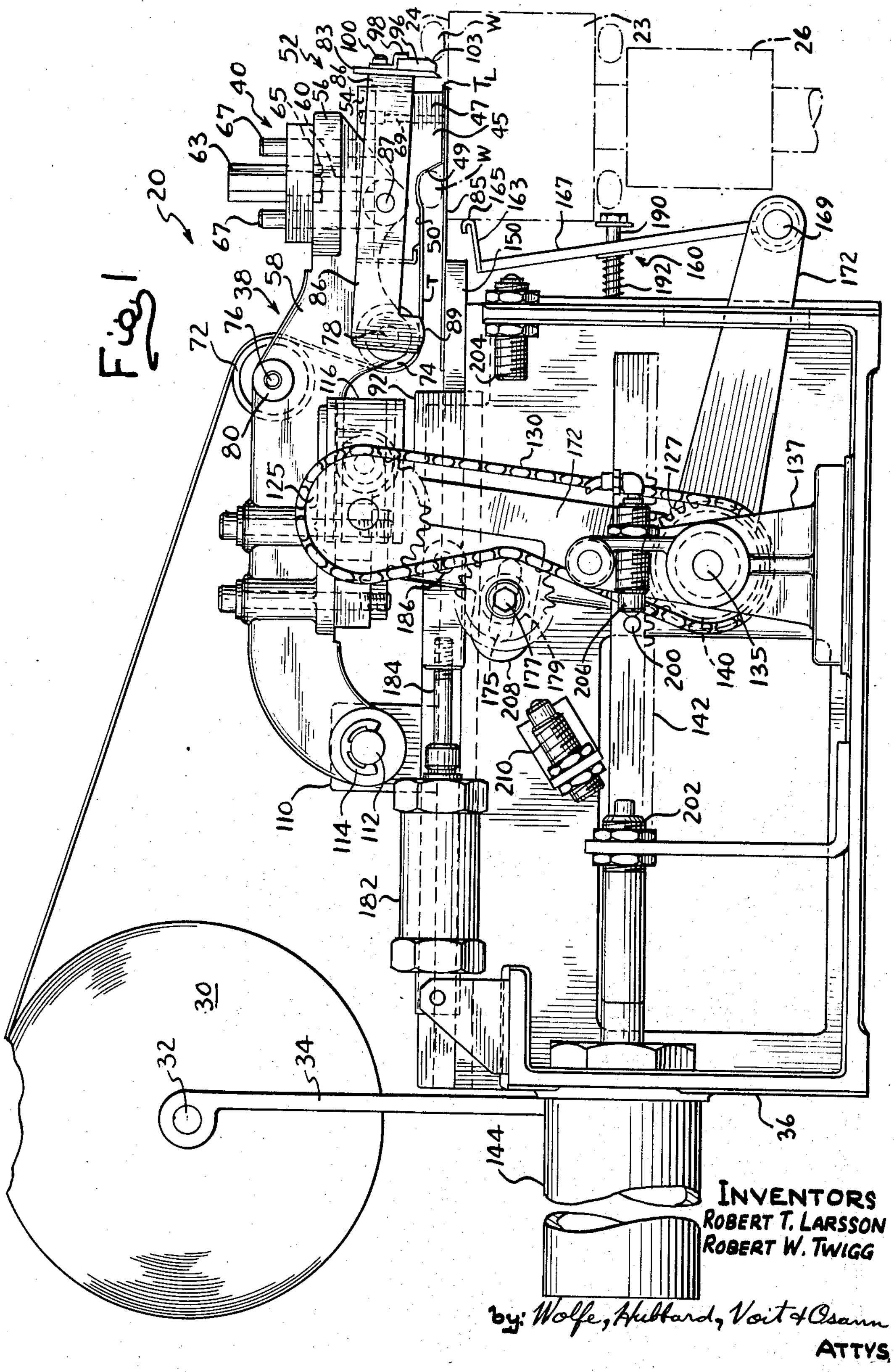
FIGURE 1 is a side elevation of a device constructed in accordance with the invention, viewed from the rear with a portion of the casing removed to show the interrelation of the various operative parts.

While the invention is susceptible of various modifications and alternative constructions, an illustrative embodiment has been shown in the drawings and will be described below in considerable detail. It should be understood, however, that there is no intention to limit the invention to the specific forms disclosed, but, on the contrary, the invention is to cover all modifications, alternative constructions and equivalents falling within the spirit and scope of the invention as expressed in the appended claims.

Turning now to the drawings, and referring particularly to FIGURE 1, an exemplary tape applying machine constructed in accordance with the principles of the invention is shown in considerable detail. Thus, in keeping with the invention, a compact device is provided which is capable of wrapping articles which are either too unwieldy or otherwise inaccessible to presently known devices. Such an exemplary wrapping device is indicated generally by the character 20, and, as will be observed, is compact and of a disarmingly simple construction.

In order to illustrate the invention with respect to a particular operation for which it has particular, though not exclusive, utility, the following description will relate the operative principles of the device to its application in the field of wrapping or tying together the rounded portions of loops of electrical wire serving as the field coils for an electric motor. For the purpose of illustrating the wide capabilities of the device, the coils of wire are illustrated as being previously mounted in the field core 23 with only a small space available between the end of the core 24 and the windings looping over their mounts. The core, complete with windings, is disposed on a representative fixture 26 which may assume any appropriate configuration suitable to support a particular article in wrapping position (as shown) with respect to the device.

In accordance with the invention, a tape supply such as a roll 30, which may be of a standard available size, is rotatably disposed on an arbor 32. It is held rigidly with respect to a tape applicator mechanism 38 by means of a post 34, conveniently mounted in this instance to the casing 36 of the device. Tape is thus supplied in a continuous ribbon (adhesive side down as viewed in FIG. 1) to a tape applicator head indicated generally by the number 40. It is the task of the applicator head, in accordance with one of the features of the invention, to initially take control of the tape ribbon as removed from the roll, and place the same on the article to be wrapped at the desired position.

More specifically, in accomplishing this feature, the head 40 embodies a resilient applicator pad 45 having a working face appropriately contoured in accordance with the profile of the article to be wrapped. For purposes of the present description, wherein a number of wires are to be wrapped, the pad is conveniently stepped, providing a projecting portion or step 47 at the lead edge thereof. The step 47 is followed by an inclined transitional surface 49, and a second rear step 50. The depth of the step 50 is preferably somewhat less than the thickness of the articles being wrapped so that appropriate pressure may be provided by movement of the head against the wires. The pad 45 is supported in a suitable frame 52 which comprise a mounting block 54 supported in depending fashion by a flange 56 formed on an applicator link 58 comprising a part of the mechanism 38. While other suitable mountings may be used, it is preferred to use a central stud 60, passing through the flange 56, and secured by nuts 63, 65 disposed on either side thereof for permitting limited adjustment of the pad position with respect to the link. A pair of studs 67 are also fixed to the block 54, on either side of the central stud 60, and are provided with springs 68 to provide a limited shock absorbing effect for the pad.

In order to provide initial control of the leading edge of the tape ribbon, designated for convenience as $T_L$, without engaging the sticky surface thereof, vacuum is employed against the backing to hold it in place. Thus, the applicator head is provided with a small passage 69 therethrough which opens at the surface near the leading edge of the pad 45 in the projecting step 47. Vacuum, supplied from any convenient source through the passage 69, holds the backing side of the tape flat against the pad. The remainder of the tape ribbon pulled from the roll 30 is supported in a relatively taut condition by feed rollers 72, 74. The rollers are mounted for rotation respectively on axle pins 76, 78 rigidly fitted to the link 58. The rollers, the tape supply roll and applicator head are all disposed in a vertical plane so that the tape is not required to deviate to the left or right from a straight path in direct line with the supply roll. If it were inconvenient to maintain such an alignment however, it is anticipated that appropriate use of guide rollers to prevent tape tangling would permit other disposition of the supply.

Since it is anticipated that the vacuum applied to control the leading edge of the tape would be nominal, and not, under normal circumstances, sufficient to permit its use in pulling tape from the roll, another way of removing an even ribbon of tape is provided. Thus, the feed roller 72 is provided with a one-way clutch 80 of any suitable known construction. It will be observed that the roller 72 engages the sticky side of the tape, and by establishing the one-way clutch 80 so that the roller 72 may rotate clockwise only, as viewed in FIG. 1, it will be appreciated that advancement of the link 58 to the right (also referring to FIG. 1) will result in tape being pulled from the supply roll.

Having now established firm control of the tape ribbon, the device is conditioned for the application of the same, for wrapping purposes, about loose bundles of wires W. This is accomplished in a number of integrated and coordinated movements, the first one of which involves moving the applicator head over the top of the article and into engagement.

Figures 3, 4:
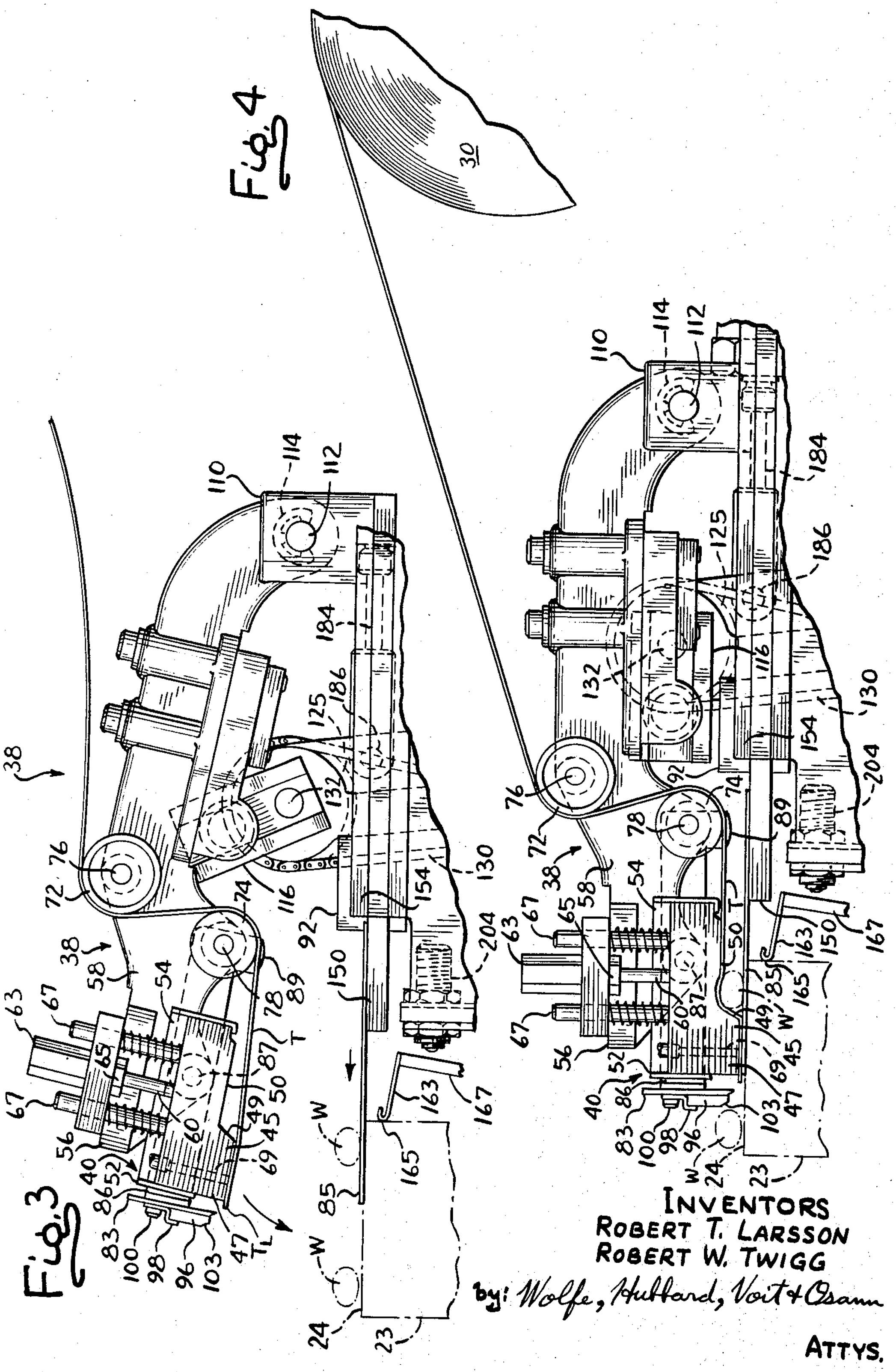
FIGS. 3 and 4 are enlarged views, in elevation, of an exemplary applicator head assembly which forms a part of the device of FIGURE 1 showing the assembly in various positions during the tape wrapping process.
Figure 5:
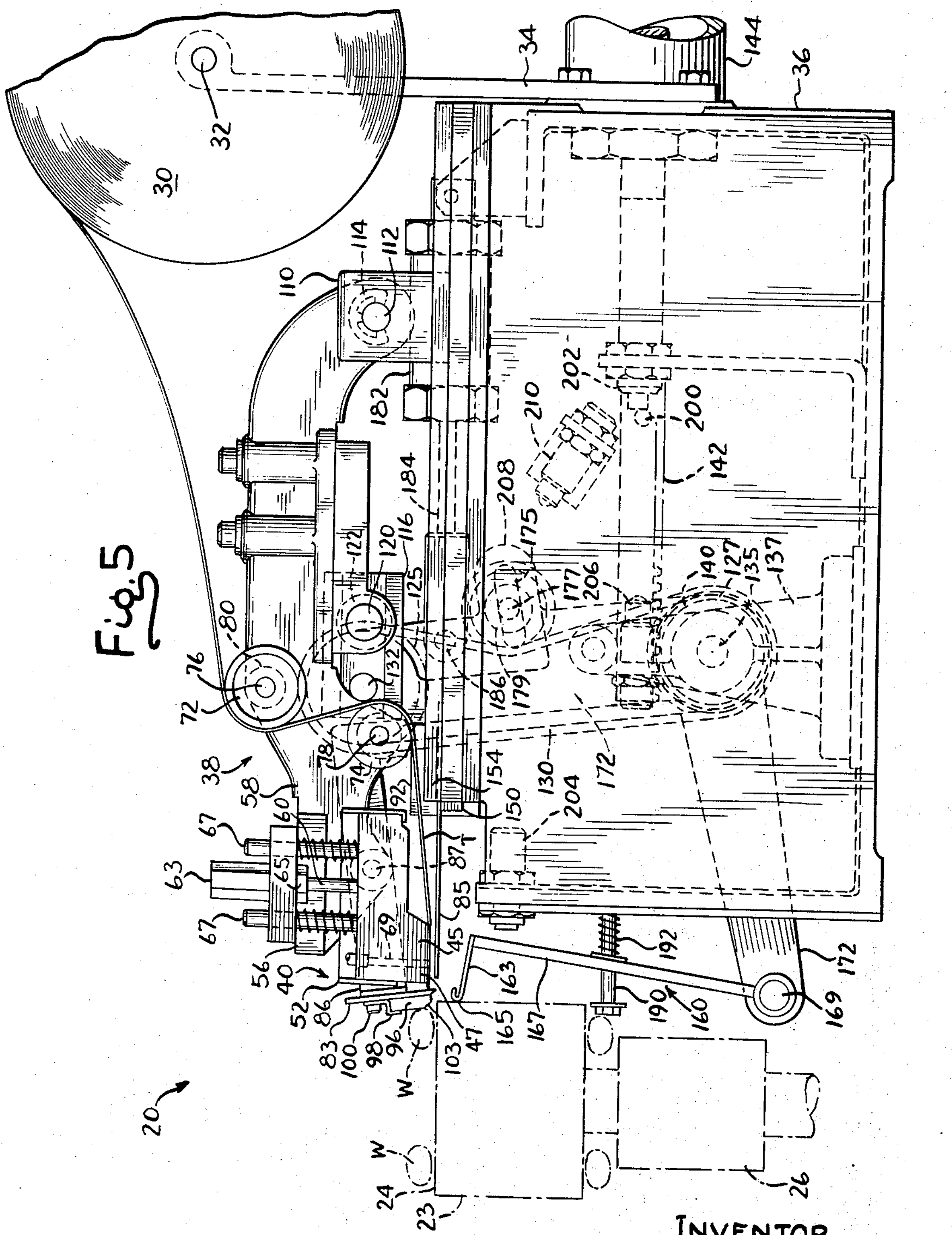
FIGS. 5 and 6 are side elevations of the FIGURE 1 embodiment, with a portion of the casing removed to show the position of the drive mechanism with respect to the position of the applicator mechanism.
Figures 7, 8, 9, 10, 11:
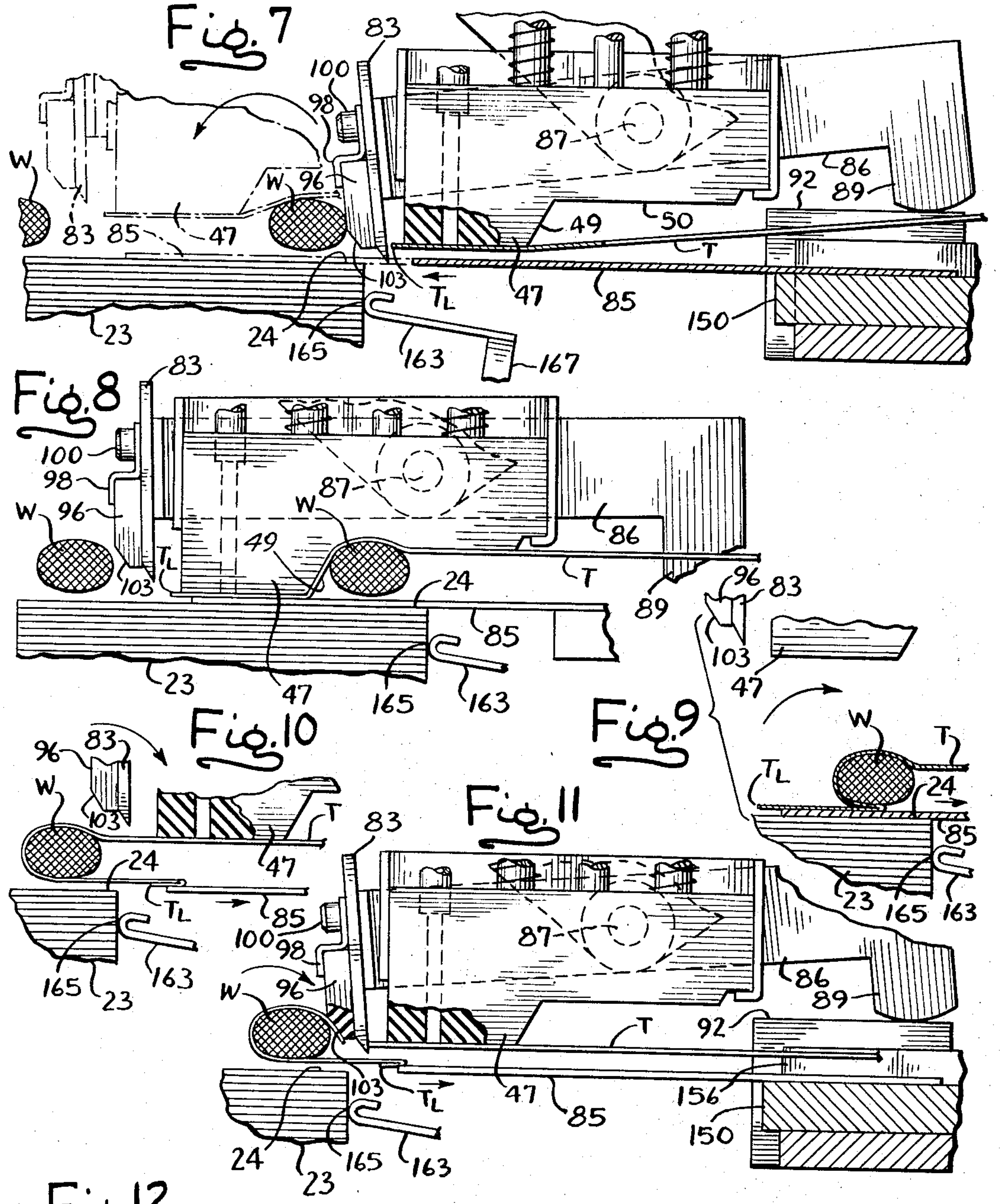
FIGS. 7 and 12 are enlarged fragmentary views of the applicator head showing the wrapping sequence performed by the FIGURE 1 device.

The applicator mechanism is best shown in its initial position prior to beginning the wrapping cycle in FIGS. 5 and 7. In order to move the applicator head from the initial position, through the FIG. 3 position to the position shown in FIGS. 1, 4 and 8, the link 58 is simultaneously raised and advanced so that the applicator head traverses an arcuate path over the article or articles (in the exemplary case, the wires) to be wrapped.

To this end, the applicator arm or link 58, which is an elongated, somewhat bow-shaped member, is pivoted at its rearward end about a post 110. A suitable pivot pin 112 mounts the arm which is held in place by a retainer clip 114. At an appropriate distance from the pivot end, which distance is determined in part by the amount of lift which may be required of the link, the link is connected to a rotatable drive crank 116. The crank (referring to FIG. 2) is formed with a "T" slot, and a complementary T-shaped lock member 118 mounted to the link 58, is fitted into the slot and fixed at a predetermined position along its length by means of a screw 120 and washer 122 (see FIG. 5). The position of the lock member in the slot determines the effective throw of the crank, and this establishes the drive relation between the crank and arm 58. The crank is formed on one end with a transversely extending drive pin 132 which narrows to define a shaft upon which a toothed gear 125 is mounted by any suitable means.

In order to provide a positive, easily controlled drive to the crank, the gear 125 is connected to a drive gear 127, mounted on a shaft 135, by means of a chain of any well-known type. The shaft 135 is supported in a frame mounted bearing block 137 and carries a second gear 140. The gear 140 is aligned with, and engages a movable rack 142 so that movement of the rack imparts movement to the crank 116 in proportion to the drive relation between them.

Having established the drive relationship between the crank and link, oscillation of the crank imparts the desired movement to the applicator head. Thus, both the lateral translation of the applicator head necessary to move it back and forth across the articles to be wrapped, as well as the raising and lowering thereof is provided by crank rotation. In accomplishing this, the pivot post 110 is mounted on a slide bar 150 (referring to FIG. 2). The slide bar is mounted in guideways 152, formed by members 154, 156 fastened to the bed of the machine by screws 158. The bar 150 is free to move along the guideways, and as the crank 116 (viewing the same in FIG. 1) is rotated counterclockwise it not only raises the link 58 a limited amount, but applies lateral forces toward the rear to the pivot post 110. The post responds to such forces by moving with the slide to the left along the slideway. The resultant action of the applicator head may be viewed sequentially in FIGS. 8, 10 and 11. The same action, of course, takes place when the rack 142 is reversed and the crank is rotated clockwise. This will have an effect on the applicator head which may be observed in FIGS. 3, 4 and 7. Thus, all of the desired head movements are effectively provided without the aid of complex linkage or multiple drive arrangement.

The applicator head alone does not provide total wrapping of the wire, but functions to bring the tape into engagement with the upper portion of the wires. In keeping with the invention, there is provided a second member, movable in conjunction with the tape applicator head, which is selectively positioned on the opposite side of the article and adapted to receive a portion of the tape from the applicator head and apply it to the underside thereof.

Again referring to FIG. 1, this feature of the invention is provided, in exemplary form, by a flat spatula-like tongue 85, which is automatically positioned with respect to the tape applicator head to accomplish the wrapping objective. More specifically, as the crank is rotated to swing the applicator head into engagement with the article to be wrapped, the tongue 85 is automatically positioned on the opposite side of the article, in close proximity to what shall be referred to for convenience as the underside thereof.

In order to circumscribe the article with tape, it is proposed to supply the member or tongue 85 with the leading portion of the tape. To this end, the applicator head 40 is initially moved over the stationary articles so that they are aligned approximately at the transitional surface 49 of the pad (see FIG. 8). It will be noted (FIG. 1) that the roller 74 is not in the plane of the step 47 of the pad, but positioned upwardly somewhat. Thus, before initial application the tape ribbon is stretched from the roller across the head 40 and directly to the step 47 where it is held by vacuum rather than following the contour of the pad 45. Accordingly, as the head moves downwardly the tape engages the surface of the articles, and is then pressed thereagainst by further downward movement of the resilient pad.

By initially aligning the head and wires as described, the leading edge of the tape $T_L$ and the portion supported by the forward step 47 of the pad extend beyond the articles and are, therefore, pressed, in accordance with the invention, directly onto the tongue 85, by the downward movement of the head (FIG. 8). Noting that the sticky side of the tape is down, the tape adheres to the tongue with sufficient force that subsequent retraction of the applicator head breaks the vacuum hold on the tape without wrinkling or otherwise disturbing it.

Having now disposed the leading edge of the tape on the tongue 85, on the side of the article opposite the tape supply, retraction of the tongue will cause the tape to peel therefrom. And because of the close proximity of the tongue to the underside of the wire, the tape will adhere to the wires (FIGS. 9 and 10). Further, the adhesive force of the tape on the member is sufficient to "pull" the articles into a reasonably tight bundle as tape is applied thereto, thereby accomplishing still another objective.

Considering the tongue 85 individually, it will be in keeping with a feature of the invention to make the tongue "blade" thin so that it may be passed between the underside of the article and its adjacent supporting surface, whether it be the field core or a supporting fixture. The width of the blade, may, of course, vary depending on clearance available, but a blade width approximating the width of the tape would be suitable and quite functional.

In order that the movements of the tongue 85 may be properly coordinated with the movements of the applicator head 40, a positive drive connection is provided. Thus, the tongue 85 is conveniently secured to the forward edge of the bar 150, thereby providing a simple way of supplying complete coordination of the applicator head and the blade at all times. As the crank is rotated to move the head toward the article, the post 110, bar 150 and tongue 85 likewise advance (FIGS. 3, 4, 7 and 8). Opposite rotation of the crank results in retraction of the members in the same manner. The total result is the wrapping of tape over the top, forward face and underside of the wires.

At this point the tape being applied to the articles is part of a long ribbon wrapped on the tape roll 30. In order, therefore, to sever the tape from the roll at the proper length, the invention provides a selectively operable cutting mechanism for severing the tape ribbon to provide a wrapping strip of the desired length.

Figure 2:
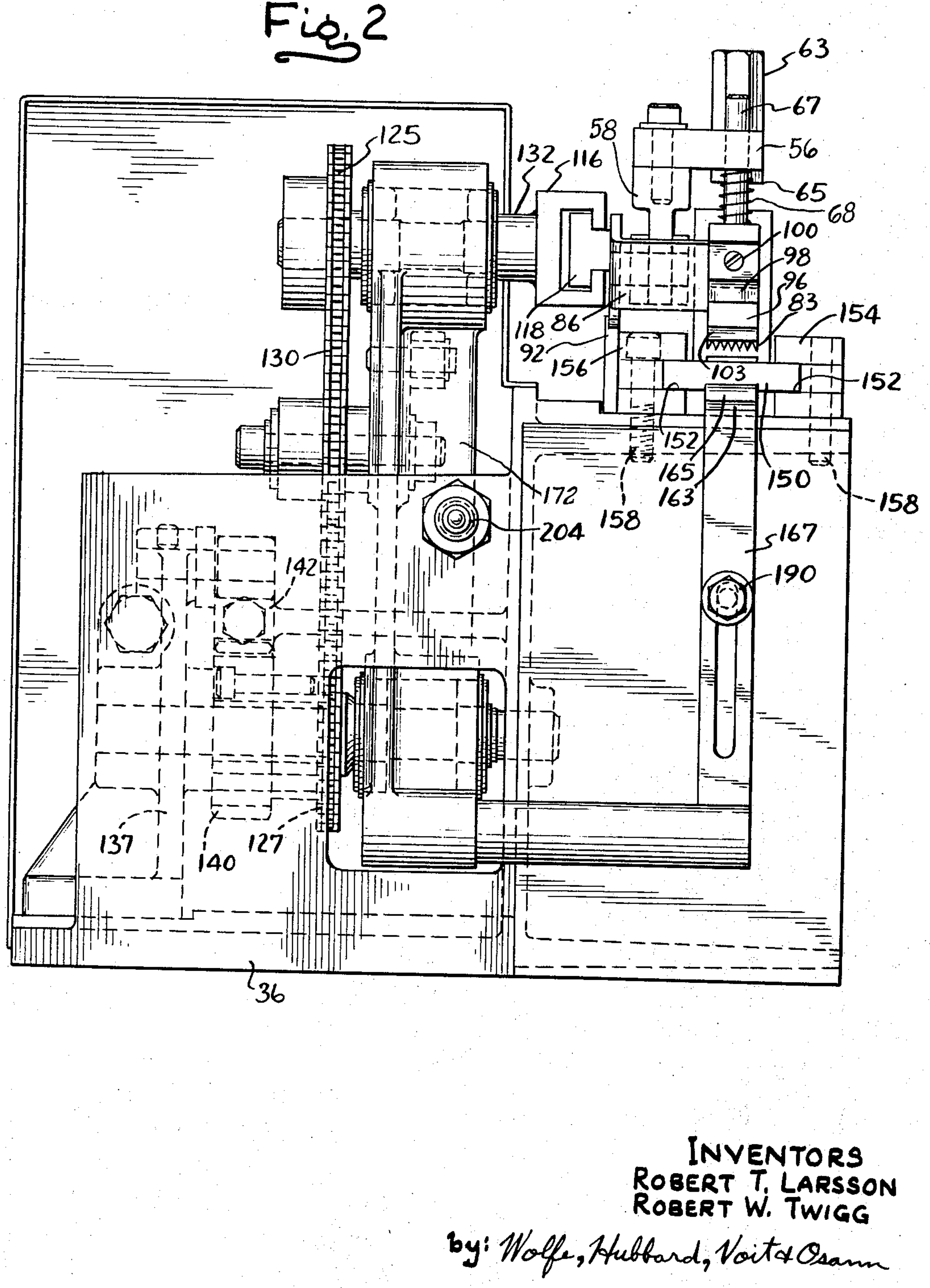
FIG. 2 is a forward end view of the device of FIGURE 1.

Referring to FIGS. 2, 10 and 11, there is provided a serrated blade 83, preferably disposed in a position normally above the tape ribbon with the cutting edge transverse to the normal movement thereof. The blade is supported by a cutter bar 86. The bar is pivotally mounted on a pin 87, projecting from the applicator head. The bar 86 is provided with a right angle bend presenting a forward face for supporting the blade 83 forwardly of the applicator pad. The bar 86 is unbalanced about the pivot 87 so that the blade 83 is normally raised above the pad surface, as seen in FIGS. 8 and 10, and thus out of the way of the normal operation of the applicator head except when the tape is to be cut. This may conveniently be accomplished by weighting the rear end of the bar, or by suitable placement of the bar on the pivot pin to bring about unbalance. The rear end of the bar is formed with a cam follower 89, and in order to provide operation of the cutter at the proper time, a cam 92 is positioned in the path of the follower so that when the applicator head has been retracted to a position substantially as indicated in FIGS. 10 and 11, further substantially downward movement of the head brings the bar follower 89 against the cam. This forces the follower upward, and, accordingly, the blade 83 downwardly and against the tape ribbon with sufficient force to cut the same at the desired length. It will be noted that severing of the tape takes place just above and to the rear of the wires W, thus providing the correct strip length with minimum waste. The length of the tape may be varied by changing the relationship of the cam to movement of the applicator head. The newly formed leading edge of the ribbon, of course, is held in place by the vacuum developed through the port in the forward step 47 of the pad.

Once the strip is severed from the ribbon, the trailing edge is loose and raised somewhat from the article, means is provided, therefore, for wiping and pressing the loose end to the article. Thus, in keeping with the invention, a wiper in the form of a small buffer pad 96 is mounted on the bar 85 forwardly, or in front of the blade 83. A small bracket 98 is provided to hold the buffer in place, and a screw 100 both holds the blade and buffer in place. The working end of the buffer pad is conveniently beveled at 103, and when the blade is cammed into the tape ribbon and passes through the plane thereof, the buffer pad engages the trailing edge of the severed strip of tape wrapped about the article and presses the same downwardly and against the articles to insure smooth and firm adhesive contact.

Figure 6:
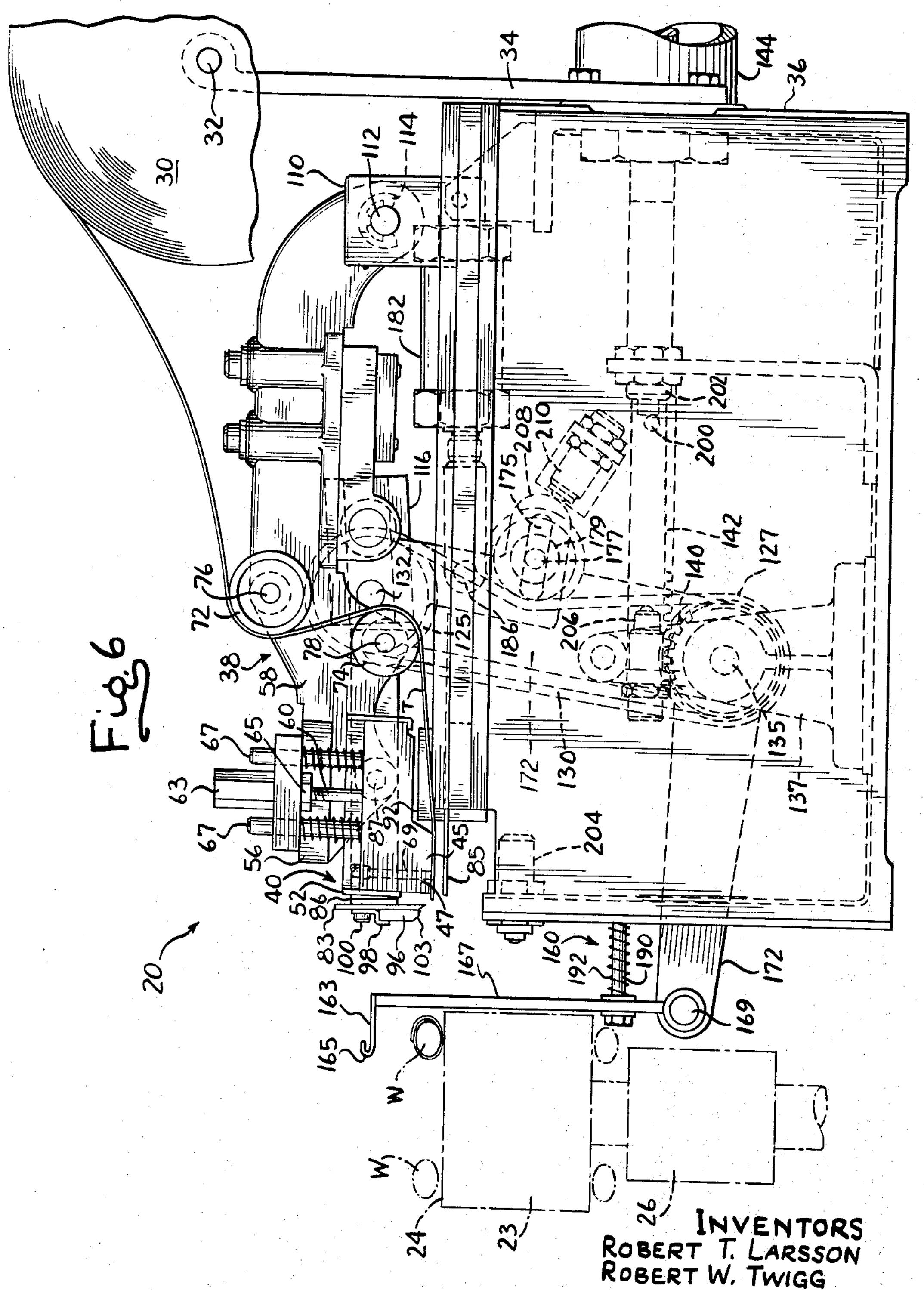

Wrapping is completed, in accordance with the invention, by pressing the end of the tape peeled from the tongue about the unwrapped portion of the wires, preferably providing a slight overlap with the end of the tape previously applied. FIGS. 1 and 6 illustrate the exemplary mechanism for completing wrapping action. A wiper is provided in the form of a finger 163 having a rounded end 165 to assure smooth engagement with the tape, and is disposed upon a link 167 which is pivotally mounted on a pin 169 to a bell crank 172. The bell crank is, itself, pivotally mounted on the shaft 135, at the junction between the two arms thereof, and carries the shaft 132 supporting the gear 125 at its upper end. The crank 172 is also formed with a guide slot 175 in which is adjustably mounted an idler gear 179 on a shaft 177. The gear 179 engages the chain 130 and is positioned to keep the chain properly tensioned.

Figure 12:
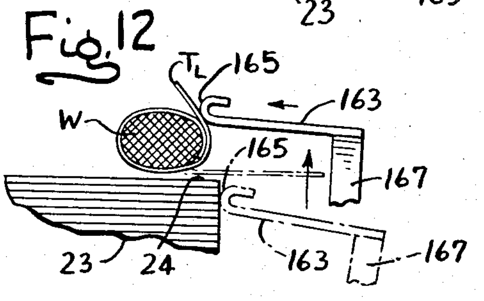

The finger mechanism is actuated, in accordance with the feature of the invention, by rocking the bell crank about its pivot pin or shaft. This is accomplished by means of a pneumatic power device 182, having a reciprocable rod 184 attached to the bell crank by means of pin 186, in this case located above the pin 177. Retraction of the rod 184 will rock the bell crank about its pivot clockwise in FIG. 6 which will result in a proportionate arcuate movement of the pin 169 holding the link 167, and, accordingly, the finger 163 will be raised to engage the tape (see FIG. 12), and press the same to the article being wrapped.

In order to provide aligned support as well as suitable pressure bias to the finger in a direction toward the article to assure firm adhesive engagement of the tape, the link 167 is formed with a longitudinal slot and is mounted on a pin 190 which supports a compression spring 192 which bears against the back side of the link 167, urging it outward. The pin also assures alignment of the finger and tape ribbon. Thus, when the finger 163 clears, in this case, the core 23, it is biased forwardly against the bundle of wires W to press the tape thereagainst. The construction of the finger permits the same to actually pass over the very end of the tape to assure its adhesion and to prevent any loose ends which might catch a foreign element.

Because of the relationship between the bell 172 crank and the pin 132 carrying the drive crank 116, it will be seen that both the applicator head and the blade are laterally retracted safely out of the way of the finger by the rocking movement of the bell crank when the rod 184 is retracted. Thus, the elements are completely interference free.

In keeping with the objective of the invention to provide an automatic tape applying device, the present device 20 is provided with motive power which automatically performs the sequence of operations leading to the complete wrapping of an article or articles, and once completed automatically shuts itself off in position ready to perform the next wrapping task. Because compressed air is usually readily available, pneumatic motors are suitable for use with the drive mechanism. It will, of course, be appreciated that while a pneumatic system is referred to herein, other forms of motive power may be adapted to the machine by those skilled in the art without departure from the invention.

Referring to FIG. 5, the machine is illustrated in condition for beginning the wrapping operation. In this position, the rack 142 is retracted to the right where a stop pin 200 engages a poppet valve 202 of conventional construction. The rod 184, on the other hand, is fully extended thereby establishing the initial position of the slide link, applicator head and cooperating blade member. Initiation of the operation of the machine may be accomplished in a variety of ways. One way is to provide an initiating poppet valve 204 in a position such that when the fixture 26 is swung into position with the article to be wrapped disposed thereon, it bumps the link 167 into the poppet valve 204 to initiate the wrapping cycle. In so doing, pressure is applied to the cylinder 144, through appropriate air connections, to cause a leftward movement of the rack 142 as seen in FIG. 5. Such movement causes a counterclockwise rotation of the gear 127, and, accordingly, the gear 132 and asociated drive crank 116. The applicator link or arm is therefore driven upwardly and over the article W. At the same time, the tongue 85 slides between the wires W and the field coil 23. Continued rotation of the crank causes the applicator arm 58 to be pressed downwardly over the article as seen in FIG. 4. In this position, the pin 200 engages a poppet valve 206 disposed in its path, and connected through a conventional spool valve (not shown) to the cylinder 144 to reverse its drive so as to retract the rack 142. The reversal of the rack results in the clockwise rotation of the gears 127, 125 (FIG. 5), and the crank 172 and the applicator arm are swung upwardly and toward the rear. Accordingly, the blade disposed beneath the wires is retracted, and the tape impressed thereon when the applicator head engages the same as seen in FIGS. 4 and 8, is peeled therefrom (FIGS. 9 and 10) and pressed to the underside of the wires. When the pin 200 engages the poppet valve 202 again, the circuit is constructed to actuate the pneumatic motor 182 to retract the rod 184 to pull the bell crank in a counterclockwise direction around its pivot. By this action, the applicator head and slide are moved further to the rear, thereby clearing the path for the finger mechanism 160. The movement of the bell crank raises the finger to engage the loose end of the tape just peeled from the blade, and press the same to the articles being wrapped. When the bell crank has been sufficiently retracted, a nose 208 of the projection in which the slot 175 is formed, engages another poppet valve 210 which is operative to reverse the pressure in the cylinder 182 to return it to its original extended position (FIG. 1) and shut off the machine. The entire cycle may take one or two seconds and the article is wrapped and may be removed and replaced by another article upon which the operation is to be performed.

We claim:

1. The method of applying a band of tape having one adhesive-coated side about an article comprising the steps of releasably holding one end of the non-coated side of the tape, pressing the adhesive-coated side of the tape against both the article and an adjacent surface at one side of the article, relatively moving said article and said adjacent surface so that the surface moves from said one side to the opposite side of the article and the tape is wrapped around three sides of said article while the adhesive-coated side is peeled from said surface, and wiping the ends of said tape in overlapping relation against the fourth side of said article.

2. The method of applying a band of tape about an article from a roll of said tape having one adhesive-coated side, comprising the steps of pulling a length of tape from said roll, releasably holding the end of the non-coated side of the tape, pressing the adhesive-coated side of the tape against both the article and an adjacent surface at one side of the article, relatively moving said article and said adjacent surface so that the surface moves from said one side to the opposite side of the article and the tape is wrapped about three sides of said article while the adhesive-coated side is peeled from said surface, severing the wrapped tape from the remainder of said roll, and wiping the ends of the severed tape in overlapping relation against the fourth side of said article.

3. A device for applying a band of tape having one adhesive-coated side about an article comprising, in combination, a frame with an adjacent article receiving position, an applicator head movably mounted on said frame, a member having a tape receiving surface facing said head and being movably mounted on said frame, means for holding the non-coated side of the end of a length of tape against said head, means on said frame for moving said head and said member from one side of said position to the other and back with the head and the member passing on opposite sides of an article in said position, said means for moving also being effective to bring said tape firmly against the article and said surface at said other side of said position so that the adhesive side of the end of the length of tape is adhered to the article and the surface, said member being moved substantially parallel with said surface so that said back movement of the member peels tape from said surface and applies it to three sides of the article in said position, and a pair of wiper elements mounted on said frame for sequential movement against the ends of the length of tape to apply the ends in overlapping relation against the fourth side of the article.

4. The combination of claim 3 in which said applicator head includes a resilient pad against which the tape is held, said pad conforming to the shape of the article when said head brings the tape firmly against the article and said surface.

5. The combination of claim 3 in which said member is a thin blade adapted to move longitudinally and pass closely adjacent to an article in said position.

6. The combination of claim 3 in which said means for holding includes a vacuum port through said head for releasably holding the tape against the head.

7. A device for applying a band of tape about an article from a storage roll of tape having one adhesive-coated side comprising, in combination, a frame with an adjacent article receiving position, a support on said frame for rotatably supporting a roll of tape, an applicator head movably mounted on said frame, a member having a tape receiving surface facing said head and being movably mounted on said frame, means for holding the non-coated side of the end of tape from said roll against said head, a tape cutting blade mounted on said head, means for moving said member from one side of said position to the other side and back, means for moving said head in unison with said member but with the head moving on the opposite side of an article in said position, said last named means also moving said head toward said surface on either side of said position so that, at said other side, the adhesive side of tape held by the head is pressed firmly against an article in said position and said surface and, at said one side, said blade severs the tape running from the article to the roll and the head is pressed against and again holds the severed tape end, said member being moving substantially parallel with said surface so that said back movement of the member peels tape from said surface and applies it to three sides of the article in said position, a first wiper element mounted on said head for applying the tape as it is severed by said blade against the article, and a second wiper element mounted for movement against the originally leading end of the tape to apply it in overlapping relation against the fourth side of the article.

8. The combination of claim 7 in which a tape-pulling roller is mounted for movement with said head so that head movement toward said other side of said position pulls more tape from said roll without disturbing the tape held by said head.

9. The combination of claim 7 in which said applicator head includes a resilient pad against which the tape is held, said pad conforming to the shape of the article when said head brings the tape firmly against the article and said surface.

10. The combination of claim 7 in which said member is a thin blade adapted to move longitudinally and pass closely adjacent to an article in said position.

References Cited

UNITED STATES PATENTS

| | | | |
|---|---|---|---|
| 3,079,977 | 3/1963 | Larkin | 156—486 X |
| 3,230,133 | 1/1966 | Lauro et al. | 156—477 |
| 2,344,340 | 3/1944 | Adams | 156—468 X |
| 2,662,467 | 12/1953 | Kaebnick et al. | 156—468 X |
| 1,981,946 | 11/1934 | Collins | 156—468 |

EARL M. BERGERT, *Primary Examiner.*

PHILIP DIER, *Examiner.*